J. E. DOREMIRE.
CORNSTALK CUTTER AND LOADER.
APPLICATION FILED NOV. 2, 1916.

1,280,686. Patented Oct. 8, 1918.
3 SHEETS—SHEET 2.

Witnesses

Inventor
J. E. Doremire
By
his Attorneys

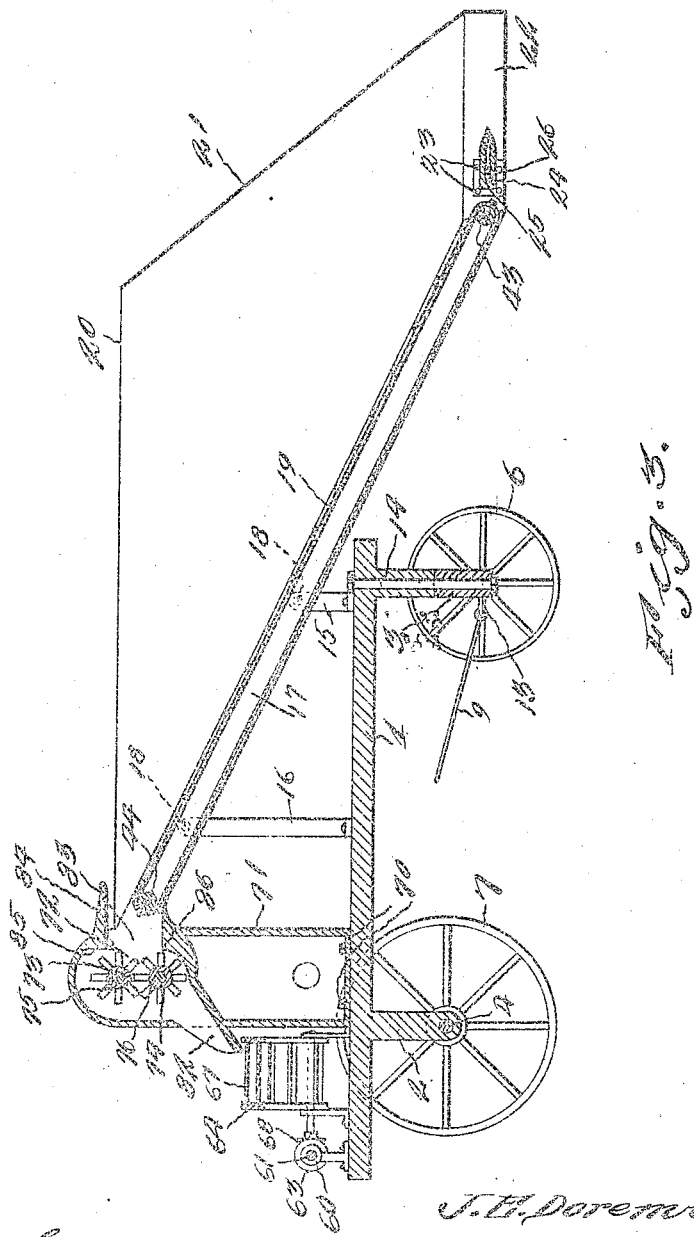

UNITED STATES PATENT OFFICE.

JACOB E. DOREMIRE, OF LEESBURG, INDIANA.

CORNSTALK CUTTER AND LOADER.

1,280,686.

Specification of Letters Patent.

Patented Oct. 8, 1918.

Application filed November 2, 1916. Serial No. 129,132.

*To all whom it may concern:*

Be it known that I, JACOB E. DOREMIRE, a citizen of the United States, residing at Leesburg, in the county of Kosciusko, State of Indiana, have invented a new and useful Cornstalk Cutter and Loader; and I do hereby declare the following to be a full, clear, and exact description of the invention, such as will enable others skilled in the art to which it appertains to make and use the same.

This invention relates to an improved corn stalk harvesting, cutter and loading machine, and an object of the invention is to provide a machine of this kind which when driven over the field will harvest or cut the stalks close to the ground, so that by means of a conveyer the stalks will be carried upwardly and rearwardly into a casing, where, by means of cutters they are cut or chopped, and then deposited on a transverse conveyer, which will deliver them into a wagon, that may be driven adjacent the machine.

A further object of the invention is to provide a casing provided with a stalk inlet mouth through which the stalks pass, to and between the cutters, which revolve in opposite directions and toward each other.

A further object of the invention is to provide a deflector projecting from the upper part of the inlet mouth of the casing to direct the stalks into the mouth.

In practical fields, the details of construction may necessitate alterations falling within the scope of what is claimed.

The invention comprises further features and combination of parts, as hereinafter set forth, shown in the drawings, and claimed.

In the drawings:—

Fig. 3 is a longitudinal sectional view on line 3—3 of Fig. 1, showing the parts in elevation.

Figure 1:
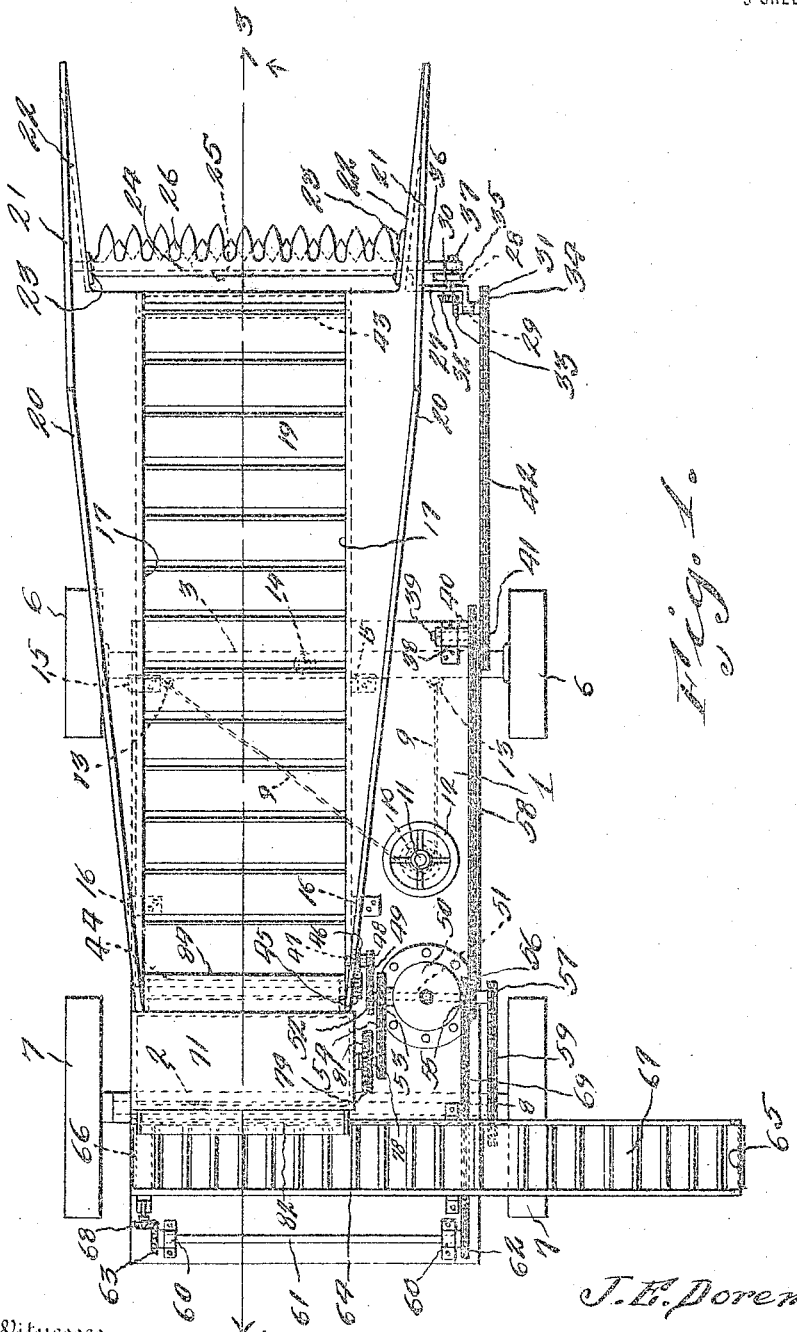
Figure 1 is a plan view of the improved machine constructed in accordance with the invention.
Figure 2:
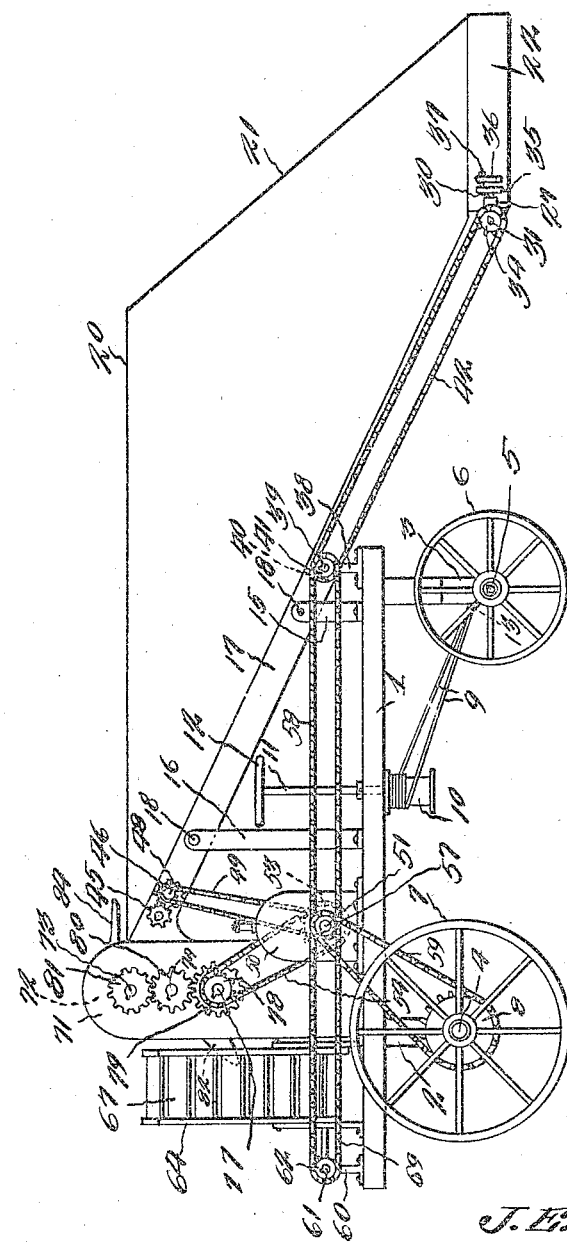
Fig. 2 is a view in side elevation of the machine.

Referring more especially to the drawings, 1 designates a suitable platform which is provided with a rear stationary bolster 2 and a forward pivoted bolster 3, in bearings of which the rear and forward axles 4 and 5 are mounted. Said axles are provided with the usual forward and rear wheels 6 and 7, and one of the rear wheels is provided with a sprocket wheel 8 rotating therewith. A suitable cable 9 is wound around a drum 10, upon the lower end of the shaft 11, which has a hand wheel 12. The opposite ends of the cable 9 are secured at 13 to the end portions of the bolster 3, so that by turning the drum 10 in one direction or the other by means of the hand wheel 12, the front bolster will be turned upon its pivot, so that the machine may turn to the right or the left. The front bolster is pivoted upon the king-pin 14. Mounted upon the platform are upright strips 15 and 16, to which the sides 17 of the conveyer frame are secured. These sides, beyond where they are secured at 18, diverge upwardly and outwardly, and have their lower portions conforming to the inclination of the elevating conveyer 19, while their upper edges 20 are substantially horizontal, while their forward edges 21 are inclined more abruptly than the inclination of the conveyer 19. The lower forward portion of the sides extend considerably beyond the lower forward end of the conveyer 19, and secured to the inner faces of said lower forward extensions 22 of the sides, as shown at 23, are the ends of the toothed mower bar 24, through a channel 25 of which a sickle or cutting bar 26 operates. Secured to one side of the conveyer frame is a bracket 27 in bearings 28 and 29 of which short shafts 30 and 31 are mounted. The shaft 30 has a beveled gear 32 on one end meshing with the beveled gear 33 on one end of the shaft 31, the outer end of which has a sprocket 34. On the other end of the shaft 30 a disk 35 is mounted, to which an extension 36 of the sickle or cutter bar is pivotally connected by means of a pin 37, which is eccentrically mounted on the disk. By imparting motion to the shaft 31, power is transmitted to the shaft 30, which imparts a reciprocating motion to the sickle or cutting bar. A bearing bracket 38 is mounted upon the forward end of the platform near one side, and has a shaft 39 mounted in a bearing thereof. This shaft is provided with two sprockets 40 and 41. A sprocket chain 42 passes about the sprockets 34 and 41. As the stalks are cut close to the ground by the sickle or cutter bar, they fall upon the conveyer 19, to be conveyed upwardly and rearwardly. By means of the upwardly and outwardly diverging sides of the conveyer frame, the stalks are guided toward and upon the conveyer 19 and are prevented from falling to one side. The conveyer 19 travels about the forward and rear rollers 43 and 44. On one end of the rear roller a gear 45 is mounted, which in turn meshes with a gear 46 on a stub shaft 47, and rotatable with the gear 46 is a sprocket 48, about which a sprocket chain 49 travels. Mounted upon the platform 1 is a suitable motor 50, on one end of the power shaft 51 of which a pair of sprockets 52 and 53 are mounted to rotate with said shaft. The sprocket chain 49 engages the sprocket 52, and traveling about the sprocket 53 is a sprocket chain 54. The other end of the motor shaft 51 is provided with three sprockets 55, 56 and 57. Traveling about the sprocket 56 is a sprocket chain 58, which engages the sprocket 40, and since the chain 58 receives power from the motor shaft, power is therefore transmitted to the sprocket 41, which will operate the sickle or cutter bar. Traveling about the sprocket 57 is a sprocket chain 59, which travels about the sprocket 8 of one of the rear wheels 7, so that by means of the motor, the machine is self-propelled. Mounted in bearings 60 of the rear part of the platform is a shaft 61, on one end of which a sprocket 62 is rotatable therewith. On the other end of the shaft 61 is a beveled gear 63. A conveyer frame 64 extends transversely of the rear upper part of said platform, and in the ends of said frame rollers 65 and 66 are mounted. Traveling about the rollers 65 and 66 is a transverse conveyer 67. On one of the pintles of the roller 66 a beveled gear 68 is fixed meshing with the beveled gear 63, and traveling about the sprockets 55 and 62 is a sprocket chain 69, so that by virtue of the motor, the sprocket chain 69 and the shaft 61, and its gear connections, motion is imparted to the conveyer 67. Secured by means of bolts 70 to the platform is a casing 71 which is provided with a compartment 72 at its upper portion. This casing is elongated transversely, and mounted in bearings of the end walls of said compartment 72 are shafts 73 and 74, on which cutters 75 and 76 are keyed. Projecting from one end wall of the casing 71 is a stub shaft 77 having a sprocket 78 keyed thereto, so as to be engaged by the sprocket chain 54. Carried by and rotatable with the sprocket 78 is a gear 79, which in turn meshes with the gear 80, with which the gear 81 meshes. It is to be seen that the gears 80 and 81 are carried by the shafts 73 and 74, hence, by virtue of the motor and the gearing with the shafts 73 and 74, the cutters 75 and 76 are rotated in opposite directions and toward each other, so that when the stalks enter the compartment 72 will pass between he cutters, and be chopped or cut into small parts, which will pass out through the chute 82 on to the transverse conveyer 65, which will transmit the ensilage laterally and upwardly to fall into a suitable wagon, which will transfer the same to a suitable silo, not shown. If necessary, a suitable receptacle may be suspended from the outer end of the conveyer frame 64, to receive the ensilage, and when the receptacle is filled, it may be dumped into the silo, not shown. The compartment 72 has a stalk entrance mouth 83, there being a deflector 84 extending from the casing 71 and over the mouth, to guide the stalks into said compartment. The interior of the compartment adjacent the mouth is provided with enlargements 85 and 86, the enlargement 85 prevents the stalks from passing above the upper cutter, while the enlargement 86 prevents the stalks from passing under the lower cutter.

The invention having been set forth, what is claimed as new and useful, is:—

In a machine as set forth, a wheel supported platform, a frame on said platform, and having half the length of its bottom overlying beyond the forward end of said platform, side members on the opposite side edges of the inclined bottom, said side members extending forwardly, and diverging upwardly and from each other and outwardly and having their upper edges substantially horizontal and their forward edges inclined downwardly and forwardly, the forward portions of the side members immediately adjacent the lower end of the inclined bottom of the frame having forwardly protruding extensions offset laterally from the lower converged parts of the side members of said frame and into which extensions the forward inclined edges of the side members merge.

In testimony whereof I have signed my name to this specification in the presence of two subscribing witnesses.

JACOB E. DOREMIRE.

Witnesses:
HENRY PAUL BYRER,
LLOYD E. HARLEY.